J. G. PERRIN.
SPEEDOMETER DRIVE.
APPLICATION FILED OCT. 27, 1913.

1,270,549.

Patented June 25, 1918.

Inventor:
John G. Perrin
by Messimer and Austin.
his Attorneys.

UNITED STATES PATENT OFFICE.

JOHN G. PERRIN, OF DETROIT, MICHIGAN.

SPEEDOMETER-DRIVE.

1,270,549.     Specification of Letters Patent.   Patented June 25, 1918.

Application filed October 27, 1913. Serial No. 797,444.

*To all whom it may concern:*

Be it known that I, JOHN G. PERRIN, a citizen of the United States, residing at Detroit, in the county of Wayne and State of Michigan, have invented certain new and useful Improvements in Speedometer-Drives, of which the following is a specification.

My invention has reference to improvements in driving means for speedometers, especially in connection with auto vehicles and one of the objects of the invention is to provide a speedometer drive, which shall avoid the use of exposed gearing of any kind and in which the driving mechanism shall be inclosed and protected from accidental injury.

Heretofore where the wheel driven shaft of the speedometer or indicator mechanism is housed within the steering spindle it has been usual to connect this shaft with the indicator driving shaft by means of beveled gears within a casing affixed to the outside of the knuckle, or, to offset the steering spindle with reference to the pivotal connection of the knuckle with the axle of the vehicle, each case requiring either a new form of steering spindle or requiring the installation of some projecting element on the knuckle thus destroying its symmetry. Another object of this invention is to provide an inclosed speedometer drive, which can be readily installed within the conventional form of steering spindle and knuckle now in general use.

It is a still further object of the invention to provide an arrangement whereby the indicator driving mechanism shall be lubricated by the usual oiler for the pivotal connection.

The various other objects of the invention will be more fully set forth in the description of one form of mechanism embodying my invention, which consists in the new and novel features of construction and combination of parts hereinafter set forth and claimed.

In the accompanying drawings:—

Figure 1:
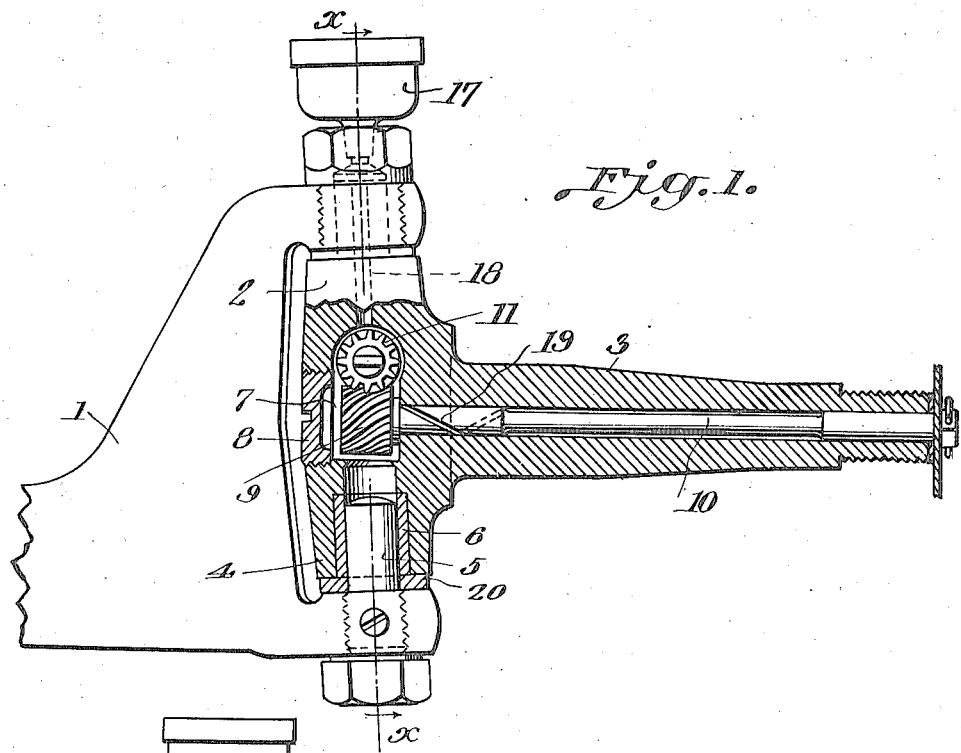
Figure 2:
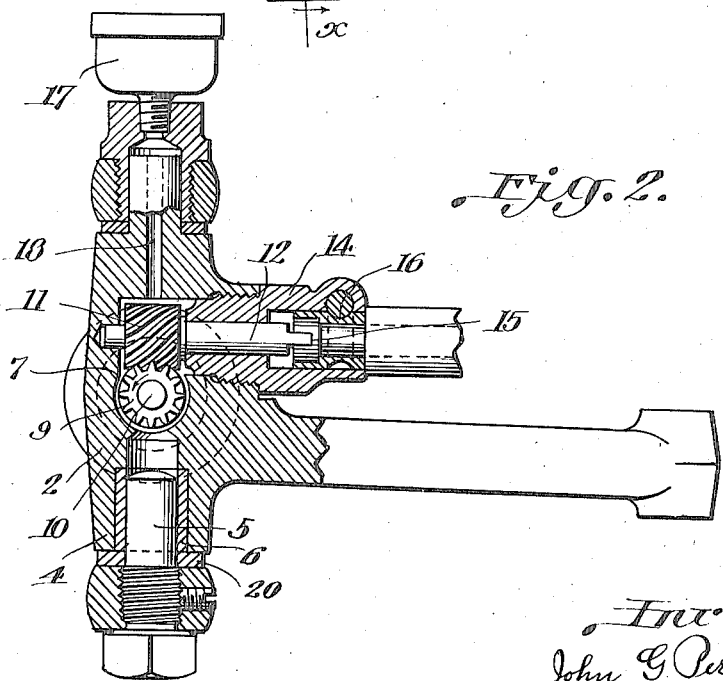

Figure 1 is a view in elevation, of a portion of a vehicle axle and combined steering knuckle and spindle shown partly in vertical section to disclose one form of the invention, and Fig. 2 is a vertical sectional view taken on the line *x—x* of Fig. 1 looking in the direction indicated by the arrow.

Referring to the accompanying drawings showing one form of mechanism embodying my invention, the vehicle axle 1 has pivoted thereto the steering knuckle 2 attached to which and preferably integral therewith is the steering spindle 3 adapted to have mounted thereon a road wheel as is usual with devices of this character. The road wheel is connected by any suitable mechanism to drive the shaft 10 which is mounted within the spindle 3 and preferably positioned parallel to the axis of said spindle. The knuckle 2 has an oil pocket 7, closed by means of the cap 8, within which pocket is mounted a pair of intermeshing spiral gears 9 and 11, one fixed to the inner end of the shaft 10 and the other fixed adjacent the end of an angularly disposed shaft 12, which shaft has one end mounted in a bearing recess countersunk in the knuckle, and the other end is journaled in a plug 14 threaded into the side of the knuckle 2 and supporting the connection between the shaft 12 and the flexible indicator driving shaft leading to the speedometer, indicator or other mechanism which is usually mounted upon the dash board of the vehicle.

The shaft 12 is connected to the flexible shaft by means of a coupling 15 locked in position by the pin 16.

The upper end of the knuckle 2 is reduced to form a pivot pin, disposed between which and the upper bearing ring of the axle 1 is an oiling device 17 which may be the usual knuckle oiler. Extended through the pin 12 is a passageway 18 by means of which oil is fed from the oiler 17 to the pocket 7.

In order to entrain the oil from the pocket 7 along the outside of the shaft 10, the portion of the shaft adjacent the pocket 7, has a spiral groove 19 extending therealong preferably for a portion of its length.

Substantially in vertical alinement below the passageway 18 and below the intermeshed gears 9 and 11, is a socket communicating with the pocket 7 and within which is inserted a pivot bolt 5 threaded through the lower bearing ring of the axle 1 to form the lower pivotal connection between the steering knuckle and axle. If desired, suitable bearings, such as the sleeve 6 and washers 20 may be inserted between the stationary and movable parts of the axle and steering knuckle.

In operation the road wheel drives the shaft 10 which in its rotation draws oil from the pocket 7 along its bearings and in turn drives the gears 9 and 11, shaft 12 and the flexible shafting leading to the indicator. The lubrication from the oiler 17 flows about the pivot pin and through the passageway 18 into the pocket 7 and then into the socket to lubricate the lower pivot bearings.

From this disclosure it is apparent that the device can be readily mounted in the conventional form of steering spindle, it being necessary merely to drill through the spindle 3 and knuckle 2 to provide a bore to accommodate the shaft 10 and its attached gear, to drill through the knuckle 2 at an angle to the shaft 10 to provide a mounting for the indicator driving shaft 12 and its attached gear and by drilling through the spindle 2 in the direction of its axis of rotation a means is provided for conveying lubrication to the gear connection between the shafts and to the shaft 10. By this construction of gearing a positive driving connection is provided between the shafts 10 and 12 by means of which a much more accurate record can be obtained than with the beveled gears now used in devices of this character. By unscrewing the plug 14, the shaft 12 together with its attached gear 11 may be withdrawn as a unit, and by withdrawing the pivot bolt 5 and washer 20, the entire spindle may be readily withdrawn to facilitate the repairing or replacing of parts. The mechanism is compact in structure and may be easily assembled, is readily accessible for repairs and the shafts are journaled so as to run steadily and without vibration. The meshed gears between the shafts run in a body of oil so that the entire device is practically noiseless in its operation.

Although I have shown one form of mechanism embodying my invention it is obvious that many changes within the skill of the mechanic may be made therein without departing from the spirit of the invention, provided the means set forth in the following claims are employed.

Having thus described my invention, I claim:

1. An article of manufacture including a combined steering knuckle and wheel spindle adapted to constitute a housing for a speedometer drive, said wheel spindle having a bore extending axially therethrough and adapted to contain a driving shaft of the speedometer drive, said knuckle having a vertically extending bore open to the spindle bore and having a portion thereof enlarged to form a pocket and adapted to contain a gear connection with the driving shaft, the lower portion of said spindle bore being enlarged to form a bearing for a spindle pivot bolt and the upper portion of said spindle bore constituting an oil passageway for feeding a lubricant to said pocket and bearing.

2. An article of manufacture including a combined steering knuckle and wheel spindle adapted to constitute a housing for a speedometer drive, said wheel spindle having a bore extending axially therethrough and adapted to contain a driving shaft of the speedometer drive, said knuckle having a vertically extending bore open to the spindle bore and having a portion thereof enlarged to form a pocket and adapted to contain a gear connection with the driving shaft, the lower portion of said spindle bore being enlarged to form a bearing for a spindle pivot bolt and the upper portion of said spindle bore constituting an oil passageway for feeding a lubricant to said pocket and bearing, said spindle also provided with an opening in the side thereof, adapted to contain an insert carrying a driven shaft forming part of the gear connection.

This specification signed and witnessed this 9th day of October, A. D. 1913.

JOHN G. PERRIN.

Signed in the presence of—
SARA A. THORNTON,
D. F. DAMES.